United States Patent
Wood et al.

(10) Patent No.: US 7,620,980 B1
(45) Date of Patent: Nov. 17, 2009

(54) SECURE DATA BROKER

(75) Inventors: David L. Wood, Louisville, CO (US);
Michael B. Dilger, Redwood City, CA (US); Thomas Pratt, Superior, CO (US); Derk Norton, Louisville, CO (US); Stan D. Shurygailo, Boulder, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/357,726

(22) Filed: Jul. 21, 1999

(51) Int. Cl.
G06F 17/00 (2006.01)
H04L 9/00 (2006.01)
G06F 17/28 (2006.01)

(52) U.S. Cl. .................. 726/14; 713/153; 713/168; 715/239

(58) Field of Classification Search .......... 713/201, 713/200, 151, 153, 168; 709/229, 230, 246; 726/11, 14; 715/239
See application file for complete search history.

(56) References Cited

U.S. PATENT DOCUMENTS

| | | | | |
|---|---|---|---|---|
| 5,602,918 A * | 2/1997 | Chen et al. | ...... | 380/21 |
| 5,710,883 A * | 1/1998 | Hong et al. | ...... | 395/200.17 |
| 5,710,889 A * | 1/1998 | Clark et al. | ...... | 395/244 |
| 5,781,729 A * | 7/1998 | Baker et al. | ...... | 395/200.6 |
| 5,790,812 A * | 8/1998 | Frohmuller et al. | ...... | 395/285 |
| 5,805,803 A * | 9/1998 | Birrell et al. | ...... | 395/187.01 |
| 5,815,665 A * | 9/1998 | Teper et al. | ...... | 395/200.59 |
| 5,826,014 A | 10/1998 | Coley et al. | ...... | 395/187.01 |
| 5,835,726 A * | 11/1998 | Shwed et al. | ...... | 395/200.59 |
| 5,870,549 A * | 2/1999 | Bobo, II | ...... | 395/200.36 |
| 5,875,296 A | 2/1999 | Shi et al. | ...... | 395/188.01 |
| 5,905,856 A * | 5/1999 | Ottensooser | ...... | 395/183.14 |
| 5,999,625 A * | 12/1999 | Bellare et al. | ...... | 705/64 |
| 6,012,098 A * | 1/2000 | Bayeh et al. | ...... | 709/246 |
| 6,092,202 A * | 7/2000 | Veil et al. | ...... | 713/201 |
| 6,094,657 A * | 7/2000 | Hailpern et al. | ...... | 707/103 R |
| 6,115,744 A * | 9/2000 | Robins et al. | ...... | 709/227 |
| 6,122,666 A * | 9/2000 | Beurket et al. | ...... | 709/226 |
| 6,266,666 B1 * | 7/2001 | Ireland et al. | ...... | 707/10 |

(Continued)

FOREIGN PATENT DOCUMENTS

GB 2434223 A * 7/2007

(Continued)

OTHER PUBLICATIONS

Schneier, Bruce, Applied Cryptography, 1996, John Wiley & Sons Inc., Second Edition, p. 2.*

(Continued)

*Primary Examiner*—Gilberto Barron, Jr.
*Assistant Examiner*—Aravind K Moorthy
(74) *Attorney, Agent, or Firm*—Brooks Kushman P.C.

(57) ABSTRACT

A secure data broker has been developed, which provides a restricted message based data exchange between a client application and a secured information resource by allowing registered or verified messages to be brokered across a security barrier. In some configurations, both requests and responses are validated and brokered across the security barrier. In other configuration, either requests or responses are validated. To support validation, messages are formatted in accordance with a predefined message specification for at least part of a transaction path between a client application and an information resource accessed by the client application.

33 Claims, 4 Drawing Sheets

U.S. PATENT DOCUMENTS

| | | | | |
|---|---|---|---|---|
| 6,289,461 | B1 * | 9/2001 | Dixon | 726/11 |
| 6,442,603 | B1 * | 8/2002 | Borella | 709/218 |
| 6,466,971 | B1 * | 10/2002 | Humpleman et al. | 709/220 |
| 6,507,856 | B1 * | 1/2003 | Chen et al. | 707/513 |
| 6,542,515 | B1 * | 4/2003 | Kumar et al. | 370/463 |
| 6,549,906 | B1 * | 4/2003 | Austin et al. | 707/10 |

FOREIGN PATENT DOCUMENTS

| | | |
|---|---|---|
| WO | 96/42041 | 12/1996 |
| WO | 98/25373 | 6/1998 |
| WO | 98/57247 | 12/1998 |
| WO | WO 2006101402 A1 * | 9/2006 |

OTHER PUBLICATIONS

Loh et al, Design and Implementation of an XML Firewall, 2006, IEEE, pp. 1147-1150.*

Matthew Fuchs, Adapting Web services in a heterogeneous environment, 2004, IEEE, pp. 656-664.*

Polivy et al, Authenticating distributed data using Web services and XML signatures, 2002, ACM, pp. 80-89.*

Jessica Heasley, Securing XML data, 2004, ACM, pp. 112-114.*

"X/Open Single Sign-On Service (XSSO)—Pluggable Authentication Modules," *Open Group Preliminary Specification*, P702 ISBN 1-85912-144-6, Jun. 1997, 140 pages.

"Kerberos: An Authentication Service for Computer Networks," USC/ISI Technical Report No. ISI/RS-94-399, 1994, *IEEE Communications Magazine*, vol. 32, No. 9, pp. 33-38, Sep. 1994, http://nii.isi.edu/publications/kerberos-neuman-tso.html, 12 pages.

"A White Paper on Authentication and Access Management Issues in Cross-organizational Use of Networked Information Resources," Clifford Lynch, editor, *Coalition for Networked Information*, Apr. 14, 1998, http://www.cni.org/projects/authentication/authentication-wp.html, 28 pages.

"AutoSecure SSO, The single-point information security solution for heterogeneous environments," *Platinum Technology Brochure*, downloaded May 3, 1999, http://www.platinum.com/products/brochure/sm/autosso/ssobroch.htm, 5 pages.

D. Davis and R. Swick, "Workstation Services and Kerberos Authentication at Project Athena," *MIT Laboratory for Computer Science Technical Memorandum #424*, Mar. 17, 1989, 12 pages.

Don Davis, "Kerberos Plus RSA for World Wide Web Security," *Proc. 1st USENIX Workshop on Electronic Commerce*, NYC, Aug. 3, 1995, 4 pages.

D. Geer and D. Davis, "Token-Mediated Certification and Electronic Commerce," *Proc. 2nd USENIX Workshop on Electronic Commerce*, Oakland, CA, Nov. 1996, 11 pages.

"Enterprise Single Sign-On, Definitions and Approaches," *Platinum Technology White Paper*, downloaded May 3, 1999, http://www.platinum.com/products/wp/wp_sso.htm, 7 pages.

"How Does Patrol CGI Server Work?" BMC Software, Houston, TX, downloaded Apr. 20, 1999, http://www.bmc.com/cgiserver/info/how_itworks.html, 3 pages.

"How to Develop a Network Security Policy, An Overview of Internetworking Site Security," *Sun Microsystems White Paper*, Palo Alto, CA, downloaded Apr. 20, 1999, http://www.sun.com/security/sec.policy.wp.html, 23 pages.

"Kerberos and 3rd Party Authentication," Version 2.1—Mar. 26, 1994, *SecurityDynamics White Paper*, Bedford, MA, http://www.securitydynamics.com/products/whitepaper/kerberos.html, 8 pages.

*Mastering Security on the Internet for Competitive Advantage*, Sun Microsystems, Palo Alto, CA, Aug. 1997, 47 pages.

Ari Medvinsky et al., "Public Key Utilizing Tickets for Application Servers (PKTAPP)," *Cybersafe Corporation Internet-Draft*, Common Authentication Technology Working Group, Issaquah, WA, Mar. 1998, http://www.ietf.org/internet-drafts/draft-ietf-cat-pktapp-01.txt, 6 pages.

"Optimizing Internet/Intranet Services with Patrol CGI Server," *BMC Software White Paper*, Houston, TX, downloaded Apr. 20, 1999, http://www.bmc.com/cgiserver/info/cgawp/html. 15 pages.

"Platinum AutoSecure Single Sign On (AutoSecure SSO)," *Platinum Fact Sheet*, downloaded May 3, 1999, http://www.platinum.com/products/factsht/assso_fs.htm, 3 pages.

"Products Application Server," *Art Technology Group Product Overview Developer Workbench*, downloaded Apr. 21, 1999, http://www.atg.com/products/das/das_main.html?didframe=true, 4 pages.

"TrustBroker™ Security Server, The Only Multi-Mechanism Authentication Server," CyberSafe Corporation, Issaquah, WA, 1999, 2 pages.

Hubbard, S. D. et al., "Firewalling the Net" BT Technology Journal, BT Laboratories, GB, vol. 15, No. 2, Apr. 1997, XP000703560, ISSN: 1358-3948, pp. 94-106.

Doty, Ted, "A Firewall Overview", ConneXions, vol. 9, No. 7, Jul. 1, 1995, XP00056423, ISSN: 0894-5926, pp. 20-23.

* cited by examiner

SECURE DATA BROKER

BACKGROUND OF THE INVENTION

1. Field of the Invention

The invention relates to information security, and more particularly, to systems and methods for improving the security of information transactions over networks.

2. Description of the Related Art

The internet has become an important medium for information services and electronic commerce. As the internet has been commercialized, organizations initially established their presence in cyberspace by making information (typically static, non-sensitive promotional information) available on resources well removed from the operational infrastructure of the organization. Security issues were often addressed by isolating publicly accessible resources (e.g., web servers) from more sensitive assets using firewall techniques. As long as the publicly accessible information and resources were relatively non-sensitive and user interactions with such information and resources was not mission critical, relatively simple firewall techniques were adequate. Though information and resources outside the firewall were at risk, the risk could generally be limited to non-proprietary information that was easily replaceable if compromised. Proprietary information and systems critical to day-to-day operations were sheltered behind the firewall and information flows across the firewall were filtered to exclude all but the comparatively non-threatening services such as electronic mail.

However, as the internet has become pervasive, and as the sophistication of tools and techniques has increased, several aspects of the security environment have changed dramatically. First, businesses have recognized the power of information transactions that more tightly couple to operational data systems, such as order processing, inventory, payment systems, etc. Such transactions include electronic commerce with direct purchasers or consumers (e.g., browsing, selecting and purchasing of books by members of the public from an on-line bookseller) as well as supply chain and/or business partner interactions (e.g., automated just-in-time inventory management, customer-specific pricing, availability and order status information, etc.). In short, commercially relevant transactions increasingly require information flows to and from secure operational systems. Second, even information-only services are increasingly mission-critical to their providers. Corporate image can be adversely affected by unavailability of, or degradation access to, otherwise non-sensitive information such as customer support information, product upgrades, or marketing and product information. Because many businesses rely heavily on such facilities, denial of service attacks represent an increasing threat.

In information security environments, authentication facilities are typically designed to establish to a desired degree of certainty that a particular transaction is performed on behalf of a particular principal. Similarly, authorization facilities are designed to enforce security policies limiting access on behalf of an authenticated principal to a particular subset of information resources. Unfortunately, despite well designed authentication and authorization facilities, information security policies and systems designed to implement such policies may be subverted by malformed requests or even well formed requests that attempt an end run around a security policy. For example, malformed requests may be employed to access secure systems by exploiting buffer overflow or similar types of security holes. In addition, malformed requests may be employed in denial of service type and other malicious attacks to crash or load down a server or information resource. Another threat involves the passing of directives (e.g., SQL statements, scripts, etc.) into an otherwise secure environment without validation and directly to an interpreter or other execution environment (e.g., an SQL engine, shell, etc.). Response messages may also be employed in ways that subvert a security policy, although such threats usually imply compromised applications or directives passed into the secure environment.

Improved systems and techniques are needed to better manage information flows across security boundaries such as those provided by a firewall (or firewalls). Otherwise, the increasingly need for access to operational systems and data threatens to compromise the security of such system and data. Alternatively, security concerns will severely limit the viability of advanced electronic commerce techniques.

SUMMARY

Accordingly, a secure data broker has been developed, which provides a restricted message based data exchange between a client application and a secured information resource by allowing registered or verified messages to be brokered across a security barrier. In some configurations, both requests and responses are validated and brokered across the security barrier. In other configuration, either requests or responses are validated. To support validation, messages are formatted in accordance with a predefined message specification for at least part of a transaction path between a client application and an information resource accessed by the client application. For example, in one configuration, incoming requests from a client application are received at a proxy that formats a corresponding request message and passes the formatted message to a parser for validation against the predefined message specification. Typically, predefined message specifications are encoded as a grammar or other functionally descriptive data representation suitable for directing a parser to validate a formatted message against a structured language definition. Message specifications are typically application and transaction specific, although in some implementations, groups of applications and/or transactions may share common message specifications. In one configuration, messages are formatted in accordance with an eXtensible Markup Language (XML) and message specifications are encoded as Data Type Definitions (DTDs).

For security reasons, predefined message specifications are preferably cryptographically secured (e.g., using digital signature techniques), although other methods of securing message specifications may be suitable in a particular implementation. In some configurations, secure protocols such as HTTPS are employed. A wide-variety of security barriers are envisioned, although, in an exemplary configuration the security barrier employs firewall technology. Only validated request messages are forwarded across the security barrier. Therefore, by suitably defining a legal set of requests (including in some configurations, both legal keyword tags and corresponding legal value ranges), security architectures in accordance with the present invention can limit security barrier crossing requests to valid requests. Similarly, in configurations that employ response validation, security barrier crossing responses can be limited to valid responses.

In one embodiment in accordance with the present invention, a method of securing a data transaction across a security barrier includes validating a request message against a predefined request message specification, transmitting the validated request message across the security barrier, validating a response message against a predefined response message specification, the response message corresponding to the validated request, and transmitting the validated response message across the security barrier.

In another embodiment in accordance with the present invention for a networked computing environment, a method of securing access to an information resource behind a security barrier includes predefining a request message specification corresponding to a structured request language, formatting an access request in accordance with the structured request language, supplying the formatted access request to a first intermediary, the intermediary validating the formatted access request in accordance with the request message specification, and forwarding the validated access request across the security barrier. In some variations, response message validation is also provided. In another variation, the method includes accessing the information resource in accordance with the validated access request.

In still another embodiment in accordance with the present invention for a networked computing environment, a method of securing access to an information resource behind a security barrier includes predefining a response message specification corresponding to a structured response language, formatting a response to an access request targeting the information resource, the formatted response being in accordance with the structured response language, supplying the formatted response to an intermediary, the intermediary validating the formatted response in accordance with the response message specification; and forwarding a validated response across the security barrier. In some variations, request message validation is also provided. In another variation, the method includes accessing the information resource in accordance with the access request from a client and supplying the client with a response in accordance with the validated response.

In still yet another embodiment in accordance with the present invention, an information security system includes a security barrier, a proxy for an information resource and a data broker on the first side of the security barrier. The proxy and the information resource being on opposing first and second sides, respectively, of the security barrier. The data broker being on the first side of the security barrier, wherein, in response to an access request targeting the information resource, the data broker validates a request message against a predefined request message specification and forwards only validated request messages across the security barrier.

In still yet another embodiment in accordance with the present invention for networked information environment including a client and an information resource separated by a security barrier, an information security system includes means for proxying an access request by the client targeting the information resource and for preparing a request message corresponding to the access request in a structured language corresponding to a predefined request message specification and means for validating the request message against the predefined request message specification and forwarding only validated request messages across the security barrier.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
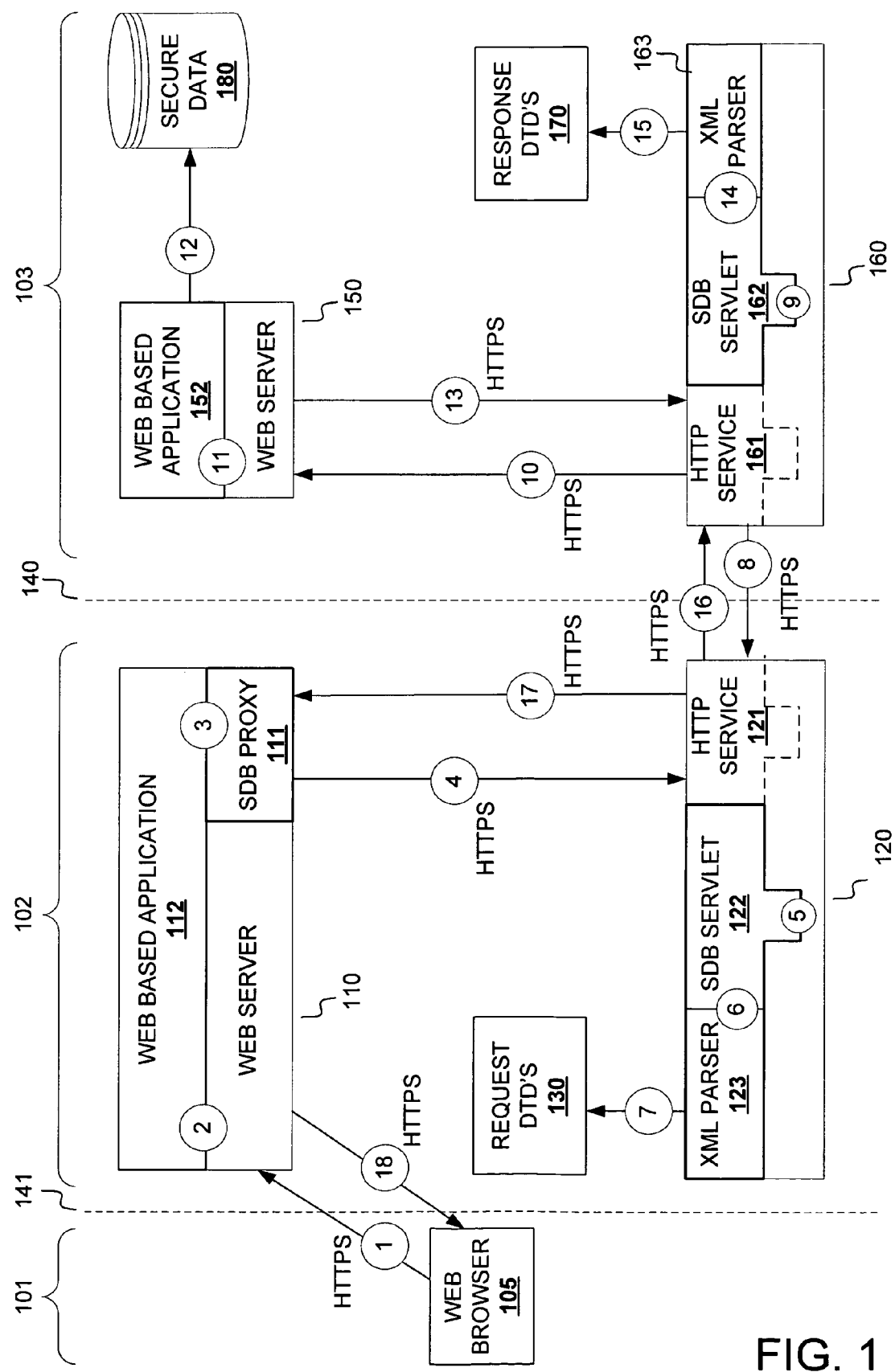
FIG. 1 depicts an information security system employing a secure data broker configuration in accordance with an exemplary embodiment of the present invention.

FIG. 1 depicts an exemplary embodiment of an information security system employing a secure data broker configuration in accordance with the present invention. In the embodiment of FIG. 1, three portions (a public network 101 portion, a private network 103 portion and a demilitarized zone 102 portion) of an internetworking environment are illustrated. Nonetheless, other network configurations and other communications networking environments may be employed. Clients, services, protocols and interfaces suitable for a particular networking environment or configuration will be appreciated by persons of ordinary skill in the art based on the description herein.

In general, a wide variety of entities, including human users operating browser and/or non-browser client applications as well as automated agents and systems, may interact with secure data broker facilities described herein. Furthermore, a variety of information resource identification schemes, such as by Uniform Resource Locator (URL), resource address, identifier or namespace designation, may be employed. However, for purposes of illustration and not limitation, an exemplary interaction involving a browser and information resources identified by URL is described in greater detail. Nonetheless, based on the description herein, persons of ordinary skill in the art will appreciate the applicability of secured data broker techniques described herein to other clients, services, applications and protocols.

Focusing then on an exemplary web (WWW) browser-type client entity, web browser 105 is operated by a user (not shown) to transmit (1) an access request targeting an information resource such as secure data 180. Typically, a targeted information resource is identified by a corresponding URL that resolves to a front-end application server 110. Front-end application server 110 includes a conventional web server and a web-based application 112 (e.g., a front-end portion of an order processing application) together with facilities to proxy the access request via a secure data broker interface. In the configuration illustrated, both a corresponding back-end application server 150 and secure data 180 reside behind a security barrier 140 such that access is restricted to paths defined by the secure data broker configuration now described. In some configurations, an additional security barrier separates web browser 105 from demilitarized zone 102 (including front-end application server 110 and secure data broker server 120).

In an exemplary realization, secure data broker proxy (SDBProxy) 111 embodies an Applications Programming Interface (API) that can be used to access the components of an SDB configuration. SDBProxy 111 defines method(s) that allow application 112 (e.g., an order processing front-end application) to send (4) a data access request to SDB server 120 and to receive a corresponding response (17). In the configuration of FIG. 1, application 112 receives the incoming access request (e.g., as form data via an HTTP POST) and prepares a corresponding request message formatted in a structured request language. The particular syntax and semantics of the structured request language are application-, and in some cases transaction-, specific. However, in an exemplary realization, the request message takes the form of an eXtensible Markup Language (XML) string (or strings) encoding hierarchical tag-value pairs to transfer data in a structured and validatable way. Application 112 transforms an incoming access request by understanding the structure of the request and impressing some of that structure on the request message. For example, in an order processing application, one transaction or part thereof may involve a user providing shipping information (e.g., recipient name, address, and delivery method such as by U.S. Mail or premium overnight delivery service). Typically, such information will be posted to application 112 by an HTTP POST of form data including the recipient name, address, and delivery method from web browser 105. Application 112 then formats a request message (e.g., as a string encoded XML message) that encodes the posted data in accordance with a predefined, order processing application- and transaction-specific format for transmission (via SDBProxy 111) to SDB server 120. XML tags are embedded within a HyperText Markup Language (HTML) message. In the configuration of FIG. 1, transmission (4) is via a secure HTTP connection SDB server 120 receives the request message using a conventional HTTP service implemented thereon and directs (5) the request message to an SDB servlet 122 for validation. In the configuration of FIG. 1, SDB servlet 122 invokes (6) an XML parser 123 to validate the request message against a request message specification that has been encoded as a Data Type Definition (DTD) corresponding to the particular application and/or transaction. DTDs are one standard encoding for request message specifications; however, other encodings are also suitable. More generally, any encoding of a grammar defining the syntax of a structured request language is suitable for use with a corresponding parser. Parser implementations are well known in the art. For example, lex and yacc are commonly employed to generate parser implementations and a variety of commercial products are available. In general, suitable parsers for XML or other structured request languages are readily available and, based on the description herein, persons of ordinary skill in the art will appreciate a variety of suitable alternative implementations. In one presently preferred realization, the structured request language is XML, the request message specifications are encoded as DTDs and request message validation is performed using an XML parser (e.g., XML parser 123) implemented as a Java™ component. Java and all Java-based marks and logos are trademarks or registered trademarks of Sun Microsystems, Inc. in the United States and other countries.

In the exemplary configuration of FIG. 1, XML parser 123 selects an appropriate DTD from amongst multiple DTDs using a RequestId passed by application 112. For example, a RequestId identifying a request message as associated with shipping information entry may select a particular corresponding DTD for use in validating the request message. In other configurations, a single grammar encoding may define legal messages corresponding to a variety of transactions. In either case, the request message is validated (7) against a request message specification specific to the application and/or transaction. For example, in an illustrative shipping information transaction, the request message may be parsed using a request message specification that requires that encoded shipping information take the form of a NAME tag followed by a string, an ADDRESS tag followed by at least two, but no more than three strings, and a SHIPPER tag followed by an integer (e.g., encoding a shipper selection). Other encodings would fail validation and a failure response would typically be generated. Note that a request message that is not validated is not transmitted across security barrier 140. In some configurations, both structure of the request message and values encoded therein may be validated. For example, maximum string lengths may be encoded in a request message specification. In this way, many buffer overflow style attacks may be blunted. In addition, values may be qualified against ranges (e.g., shipper numbers between 1 and 5), content constraints or for consistency with an expected data type (e.g., a string encoding in accordance with a known character set). Referring illustratively to the configuration of FIG. 1 and to an XML request message format, if an XML encoded request message is successfully parsed using a corresponding DTD, SDB servlet 122 forwards (8) the XML request via a secure HTTP connection to another SDB web server (e.g., SDB server 160) across security barrier 140. Otherwise, a failure response message is created and returned (17) to SDBProxy 111.

SDB server 160 receives a validated request message (8) from across security barrier 140 and using a conventional HTTP service implemented thereon and directs (9) the request message to an SDB servlet 162 for relay (10) to back-end application server 150 via a secure HTTP connection. Back-end application server 150, in turn, delivers (11) the validated request message, which in an exemplary embodiment is XML encoded, to web-based application 152 (e.g., a back-end portion of an order processing application) hosted thereon. Application 152 processes the validated request message by retrieving or updating (12) the associated secure data 180. For example, in the case of access request posting shipping information, application 152 may create or update a customer record in a database to include the encoded shipping information. Access by application 152 to secure data 180 may be via any of a number of suitable techniques. For example, secure data 180 may be represented in a relational database and application 152 may interact with an associated DataBase Management System (DBMS) using Structured Query Language (SQL). Note that, in such a SQL-based configuration, the security of secure data 180 is enhanced by forcing the transaction to pass validation at SDB server 120 and more particularly by not allowing a string encoding of a SQL statement to pass directly through security barrier 140 to an SQL engine. In general, the storage format for secure data 180 and mechanism used by the application to access secure data 180 (e.g. SQL, JDBC, RPC, etc.) is application specific and need not affect a particular secure data broker configuration.

Note that in the illustrative configuration of FIG. 1, neither web browser 105 nor secure data 180 need generate or understand the selected structured request language (e.g., XML). As a result, secure data broker facilities can be interposed between existing commercial embodiments of browsers and information resources without modification of the browser or information resource. In other configurations, either or both of web browser 105 and secure data 180 may integrate XML support. In the case of web browser 105, XML support may take the form of a plug-in or other support specific to a suite of eCommerce applications.

Once the validated request message has been serviced by retrieval from or update to secure data 180, a response is supplied. For example, in response to a successful entry of shipping information, application 152 may generate an order confirmation number for supply to web browser 105. In the configuration of FIG. 1, response messages are likewise encoded in accordance with a structured response language and validated against a response message specification (e.g., a response DTD). SDB server 160 receives (13) the response message via the existing secure HTTP connection and directs (9) the response message to an SDB servlet 162 for validation. As before, the SDB servlet (e.g., SDB servlet 162) invokes (14) an XML parser 163 to validate the response message against a response message specification that has been encoded as a Data Type Definition (DTD) corresponding to the particular application and/or transaction.

In the exemplary configuration of FIG. 1, XML parser 163 selects an appropriate DTD from amongst multiple DTDs using a ResponseId passed by application 152. For example, a ResponseId identifying a response message as associated with shipping confirmation may select a particular corresponding DTD for use in validating the response message. As before, other encodings (e.g., as a grammar) may define legal messages. In either case, the response message is validated (15) against a response message specification specific to the application and/or transaction. For example, in the illustrative shipping information transaction, the response message may be parsed using a response message specification that requires that encoded information take the form of a CON-FIRMATION_NUMBER tag followed by a string of predetermined length. Note that a response message that is not validated is not transmitted across security barrier 140. Instead, an error response is typically transmitted (16) over the existing secure HTTP connection.

If instead, the response message validated, a validated response message is transmitted (16) across security barrier 140 via the existing secure HTTP connection to SDB server 120. In turn, SDB server 120 relays (17) the validated response message on to SDBProxy 111 at front-end application server 110 via the existing secure HTTP connection. In the illustrative embodiment of FIG. 1, SDBProxy 111, in turn, extracts response data from the XML formatted validated response message and supplies the response data to application 112 (e.g., a front-end portion of an order processing application). For example, an encoded order confirmation number may be supplied to application 112. Finally, front-end application server 110 supplies (18) a response (including e.g., the order confirmation number) to web browser 105 for presentation to the user thereof. Note that SDBProxy 111 maintains an open HTTPS connection with SDB server 120 for the duration of each XML request message (4) to validated response message (17) transaction. Multiple instances of SDBProxy 111 (and similarly of other components in a particular secure data broker configuration) may be employed to handle multiple concurrent requests. Each SDBProxy instance is preferably single threaded to facilitate correlation of requests and responses, although other techniques such as secure transaction identifiers (e.g., tokens) may also be employed.

In the configuration of FIG. 1, security barrier 140 is illustrative of a wide variety of structures and/or methods by which back-end application server 150 is or can be protected from direct access from public network 101 or demilitarized zone 102. One realization of security barrier 140 includes a firewall or other selective filter. Although packet filter, firewall, or bastion server based security barriers are presently preferred. Other facilities are also suitable, for example server-based facilities that ensure SDB server 160 only accepts connection requests from SDB server 120 and by which back-end application server 150 and other similarly situated back-end applications servers) only accept connection requests from SDB server 160 may be employed as, or as part of, security barrier 140. One bastion server implementation interposes a server hosting facilities illustrated separately as SDB server 120 and SDB server 160 on a single server platform.

The integrity of a secure data broker configuration generally requires that request and response message specifications (e.g., request DTDs 130 and response DTDs 170) be secured; however, any of a variety of mechanisms is suitable. For example, use of security barriers 140 and 141 tends to enhance message specification security. In some configurations, request and response message specifications are cryptographically secured to prevent unauthorized modification. Conventional digital signature or encryption based techniques may be employed. Alternatively, request and/or response message specifications may be encoded in read only media to prevent unauthorized modification.

Figure 2:
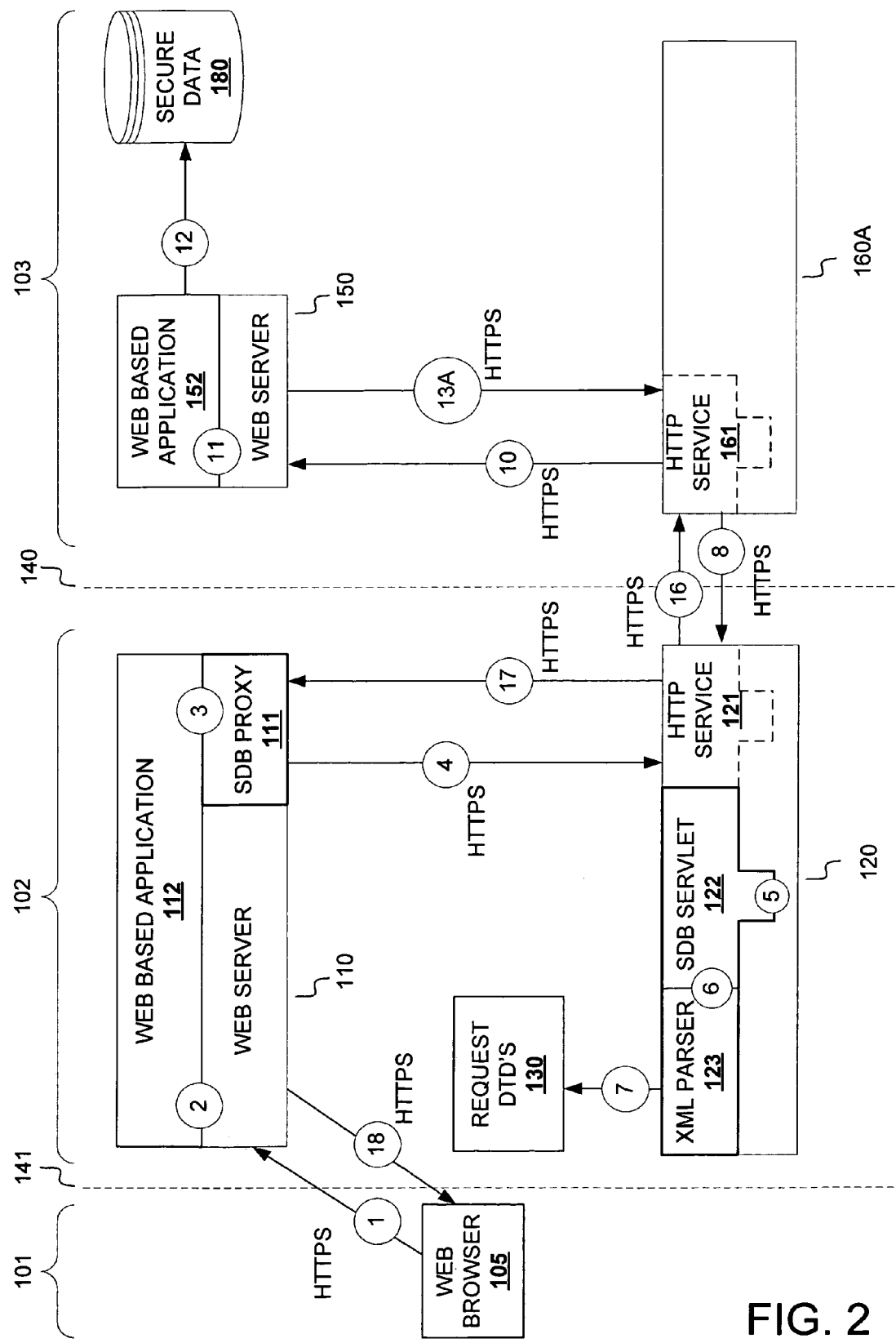
FIGS. 2, 3 and 4 depict information security system employing a secure data broker configuration in accordance with exemplary alternative embodiments of the present invention.
Figure 3:
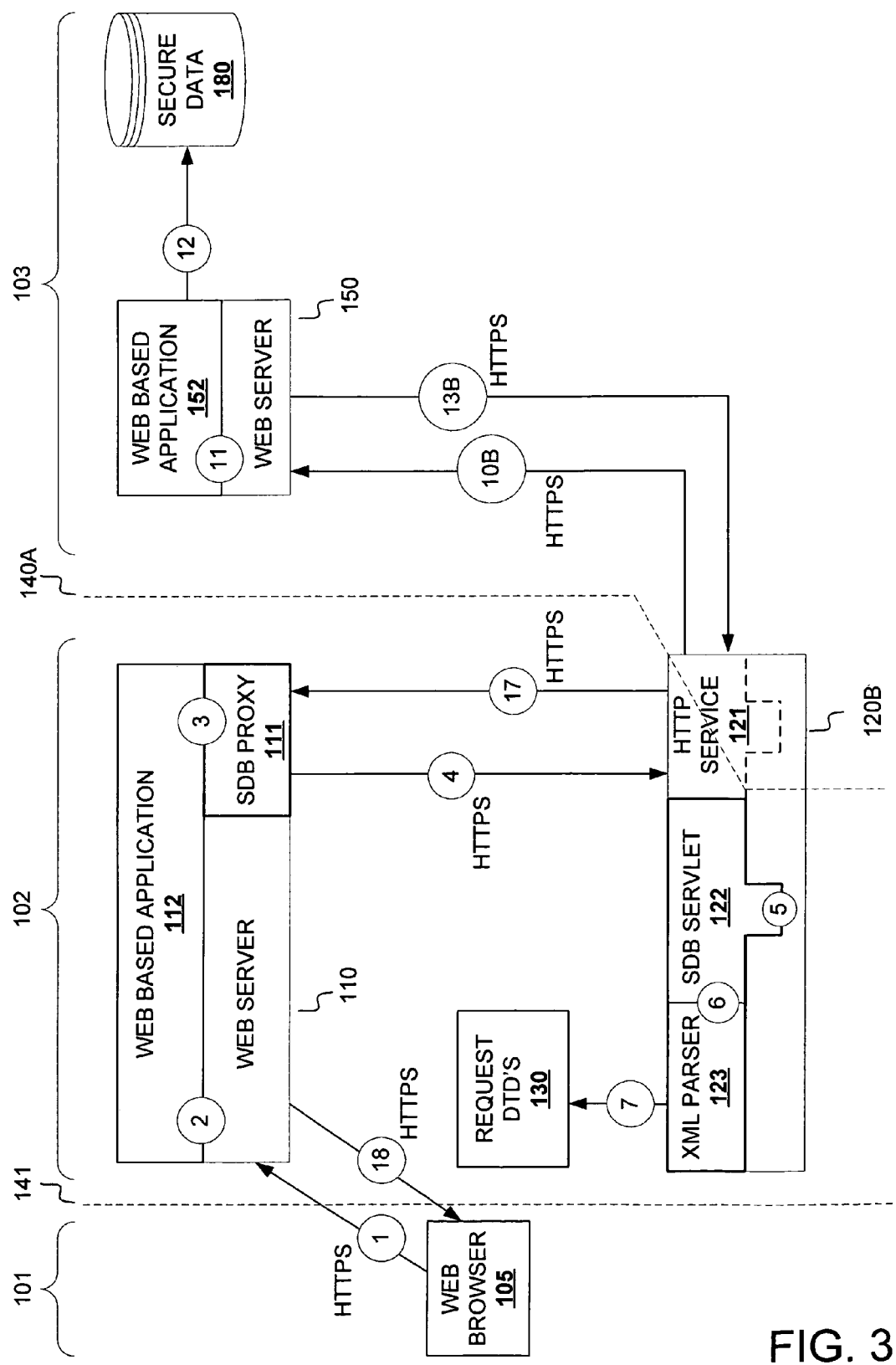
Figure 4:
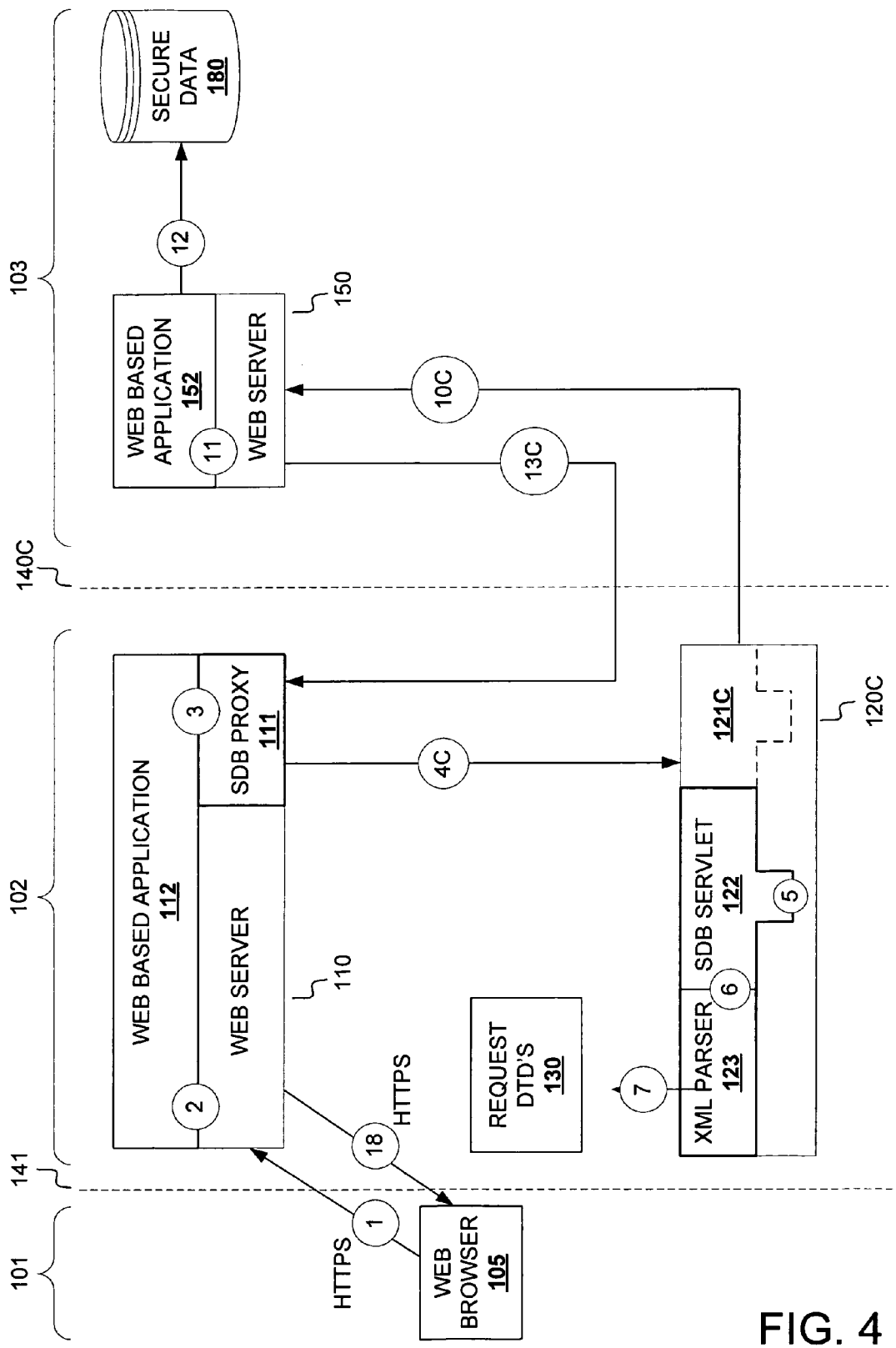

FIGS. 2-4 illustrate several variations on the secure data broker configuration described above. As before, the exemplary web (WWW) browser-type client entity and internetworking components are merely illustrative. Clients, services, protocols and interfaces suitable for other networking environments or configurations will be appreciated by persons of ordinary skill in the art based on the description herein. FIG. 2 illustrates a configuration in which only request messages are validated against corresponding request message specifications. Such a request validation only configuration tends to improve performance. In general, malformed or malicious requests are a greater threat than malformed or malicious responses, particular in private network 103 configurations for which the integrity of applications can be reasonably assured. Accordingly, validation of response message 13A is foregone and back-end application server 150 need not XML encode the response message. Nonetheless, some configurations in accordance with the present invention may include XML encoding of response messages along at least a portion of the return path (13A, 17) to front-end application server 110. In the configuration of FIG. 2, the role of SDB server 160A is rather limited, serving as a relay point. In configurations wherein security barrier 140 includes a firewall, use of a relay point may facilitate packet filter design.

FIG. 3 illustrates a configuration in which SDB server 160 is eliminated, in which validated request messages (10B) are supplied directly from SDB server 120B to back-end application server 150 and in which response messages are returned (13B) directly from back-end application server 150 to SDB server 120B. Response messages are, in turn, relayed (17) back to SDBProxy 111. A variety of configurations in accordance with FIG. 3, including bastion server implementations, will be appreciated by persons of ordinary skill in the art based on the description herein. For example, in one such configuration, SDB server 120B is hosted on a server that provides the routing interface between demilitarized zone 102 and private network 103. As before, back-end application server 150 need not XML encode the response message, although some configurations in accordance with the present invention may include XML encoding of response messages along at least a portion of the return path (13B, 17) to front-end application server 110. Although not illustrated in FIG. 1, such an approach can also be employed in configurations in which both request message and response message validation are performed. In such a configuration (not shown) facilities of SDB server 120 and SDB server 160 could be hosted on a bastion server acting as a security barrier interposed between front-end application server 110 and back-end application server 150.

FIG. 4 illustrates yet another configuration in accordance with the present invention. Although previous configurations have employed connection oriented use of protocols such as HTTP (or HTTPS), the configuration of FIG. 4, illustrates a secure data broker configuration in which response (13C) need not be returned via an existing connection. Instead, request message 4C, validated request message 10C and response message 13C are conveyed asynchronous protocols. For example, MQSeries protocols may be employed. Alternatively, HTTP may be employed in an unconventional manner. For example, request message 4C and validated request message 10C may each be conveyed by HTTPS connections that complete. Then, response message 13C may be conveyed by an independent transaction. Configurations employing other asynchronous protocol will be appreciated by persons of ordinary skill in the art based on the description herein. The configuration of FIG. 4 presents some security challenges such as protection against spoofing and direction-specific ALLOW/DENY behavior of security barrier 140C. Nonetheless, techniques including the use of token based credentials (i.e., credentials that are passed with the message sequence) and asymmetric packet filter definition may be employed to overcome these challenges. As before, although not shown, functionality of SDB server 120C and security barrier 140C may be hosted on a bastion server interposed between demilitarized zone 102 and private network 103.

In some exemplary embodiments, at least some of the above-described components are implemented as servlets executable in the context of a commercially-available web server environment. For example, the Java™ Embedded Server (JES) architecture with extensions for certificate handling, HyperText Transfer Protocol (HTTP), Simple Network Management Protocol (SNMP), Secure Sockets Layer (SSL), eXtensible Markup Language (XML) grammar processing and security Access Control List (ACL) support available from Sun Microsystems, Inc. is one suitable environment. Java and all Java-based marks and logos are trademarks or registered trademarks of Sun Microsystems, Inc. in the United States and other countries. In some configurations, portions of a secure data broker implementation are implemented in a light weight framework, such as the Java embedded server, for creating distributed services. Java servlets can be plugged into the framework dynamically in a secure fashion. The framework then handles the communication between the servlets.

In general, the description herein is focused on aspects of a secure data broker facility, rather than on peculiarities of a particular implementation environment. It is envisioned that secure data broker facilities in accordance with the teachings of the present invention may be implemented in the context of many commercially-available networked information service environments, including web server environments, as well as in custom environments and environments that in the future will be developed. However, to facilitate an understanding of broad concepts using a specific exemplary environment, and without limitation, the description herein may include terminology specific to certain illustrative server architectures (e.g., Java Web Servers and Java Embedded Server architectures), protocols (e.g., HTTPS) and structured language frameworks (e.g., XML). Nonetheless, based on this description, persons of ordinary skill in the art will appreciate implementations suitable for other environments. The scope of the invention, as defined by the claims that follow, is not limited to any specific implementation environment.

While the invention has been described with reference to various embodiments, it will be understood that these embodiments are illustrative and that the scope of the invention is not limited to them. Many variations, modifications, additions, and improvements are possible. For example, boundaries between various components, services, servlets, registries and frameworks are somewhat arbitrary, and particular operations are illustrated in the context of specific illustrative configurations. Other allocations of functionality are envisioned and may fall within the scope of claims that follow. Structures and functionality presented as discrete components in the exemplary embodiment(s) may be implemented as a combined structure or component. These and other variations, modifications, additions, and improvements may fall within the scope of the invention as defined in the claims that follow.

What is claimed is:

1. In a networked computing environment, a method of securing access to an information resource behind a security barrier, the method comprising:
  predefining a request message specification corresponding to a structured request language including extensible markup language;
  formatting an access request in accordance with the structured request language;
  supplying the formatted access request to a first intermediary, the intermediary validating the formatted access request in accordance with the request message specification; and
  forwarding the validated access request across the security barrier.

2. A method as in claim 1, further comprising:
  accessing the information resource in accordance with the validated access request.

3. A method as in claim 1, further comprising:
  receiving, at an application proxy, an access request targeting the information resource; and
  performing the access request formatting at the application proxy.

4. A method as in claim 1, further comprising:
  predefining a response message specification corresponding to a structured response language;
  formatting a response to the access request in accordance with the structured language;
  supplying the formatted response to a second intermediary, the second intermediary validating the formatted response in accordance with the response message specification; and
  forwarding a validated response across the security barrier.

5. A method as in claim 4, further comprising:
  accessing the information resource in accordance with an access request from a client; and
  supplying the client with a response in accordance with the validated response.

6. In a networked computing environment, a method of securing access to an information resource behind a security barrier, the method comprising:
  predefining a response message specification corresponding to a structured response language including extensible markup language;
  formatting a response to an access request targeting the information resource, the formatted response being in accordance with the structured response language;
  supplying the formatted response to an intermediary, the intermediary validating the formatted response in accordance with the response message specification; and
  forwarding a validated response across the security barrier.

7. A method as in claim 6, further comprising:
  accessing the information resource in accordance with the access request from a client;
  supplying the client with a response in accordance with the validated response.

8. An information security system comprising:
a security barrier;
a proxy for an information resource, the proxy and the information resource on opposing first and second sides, respectively, of the security barrier;
a data broker on the first side of the security barrier, wherein, in response to an access request targeting the information resource, the data broker validates a request message encoded in a structured request language including extensible markup language against a predefined request message specification therefor and forwards only validated request messages across the security barrier.

9. An information security system as in claim 8, further comprising:
a second data broker on the second side of the security barrier, wherein, in response to an access targeting the information resource, the second data broker validates a response message against a predefined response message specification and forwards only validated response messages across the security barrier.

10. An information security system as in claim 8, further comprising:
the information resource.

11. A computer program product encoded in computer readable media, the computer program product comprising:
data broker code and parser code executable on a first network server separated from an information resource by a security barrier;
the data broker code including instructions executable as a first instance thereof to receive access requests in a structured language including extensible markup language corresponding to a predefined request message specification and to forward validated ones of the access requests across the security barrier toward the information resource; and
the parser code including instructions executable as a first instance thereof to validate the received access requests against the predefined request message specification.

12. The computer program product of claim 11, further comprising:
an encoding of the predefined request message specification.

13. The computer program product of claim 11,
wherein the data broker code and parser code are also executable on a second network server separated from a client application by the security barrier;
wherein the data broker code includes instructions executable as a second instance thereof to receive responses in a structured language corresponding to a predefined response message specification and to forward validated ones of the responses across the security barrier toward the client application; and
wherein the parser code includes instructions executable as a second instance thereof to validate the received responses against the predefined response message specification.

14. The computer program product of claim 13, further comprising:
an encoding of the predefined response message specification.

15. The computer program product of claim 11, further comprising:
application proxy code including instructions executable to format the access requests in accordance with the structured language corresponding to the predefined request message specification.

16. The computer program product of claim 11, encoded by or transmitted in at least one computer readable medium selected from the set of a disk, tape or other magnetic, optical, or electronic storage medium and a network, wireline, wireless or other communications medium.

17. A method of securing a data transaction across a security barrier, the method comprising:
validating a request message encoded in a structured request language including extensible markup language against a predefined request message specification therefor;
transmitting the validated request message across the security barrier;
validating a response message encoded in a structured response language including extensible markup language against a predefined response message specification therefor, the response message corresponding to the validated request; and
transmitting the validated response message across the security barrier.

18. A method as in claim 17,
wherein the request and the response message validatings are respectively performed at first and second secure data brokers on opposing sides of the security barrier; and
wherein the validated request and response message transmissions are between the first and second secure data brokers.

19. A method as in claim 17,
wherein the request message validating includes:
parsing the request message using Data Type Definitions (DTDs) encoding a hierarchy of valid tag-value pairs in accordance with syntax of a valid request message; and
if the request message is not successfully parsed, forwarding a response message without transmission of the request message across the security barrier.

20. A method as in claim 17,
wherein the response message validating includes:
parsing the response message using Data Type Definitions (DTDs) encoding a hierarchy of tag-value pairs in accordance with syntax of a valid response message.

21. A method as in claim 17,
wherein the request and response message specifications are predefined in accordance with valid request and response message constraints specific to an information resource.

22. A method as in claim 17,
wherein at least one of the request and response message specifications is cryptographically secured.

23. A method as in claim 17, further comprising:
receiving, at an application proxy, an access request targeting an information resource;
formatting the request message in a structured language corresponding to the request message specification; and
transmitting the formatted request message to a secure data broker for the request message validating.

24. A method as in claim 17, further comprising:
formatting the response message in a structured language corresponding to the response message specification; and
transmitting the formatted response message to a secure data broker for the response message validating.

25. A method as in claim 17, further comprising:
accessing an information resource in accordance with the validated request message; and
preparing the response message in accordance with the access.

26. A method as in claim 25,
wherein the response message is formatted in a structured language corresponding to the response message specification.

27. A method as in claim 17,
wherein at least one of the validated request message transmitting and the validated response message transmitting is via a secure protocol.

28. A method as in claim 17,
wherein at least one of the validated request message and the validated response message is encoded in a markup language.

29. A method as in claim 17,
wherein the security barrier includes a firewall.

30. A method as in claim 17,
wherein the security barrier includes a secure communication channel between servers.

31. In a networked information environment including a client and an information resource separated by a security barrier, an information security system comprising:

means for proxying an access request by the client targeting the information resource and for preparing a request message corresponding to the access request in a structured language including extensible markup language corresponding to a predefined request message specification;

means for validating the request message against the predefined request message specification and forwarding only validated request messages across the security barrier.

32. An information security system as in claim 31, further comprising:

means for validating a response message against a predefined response message specification and forwarding only validated response messages across the security barrier.

33. An information security system as in claim 31, further comprising the security barrier.

* * * * *